March 14, 1939. A. A. FORSBERG 2,150,765

COUPLING

Filed Feb. 1, 1937

INVENTOR.
Axel Albert Forsberg
BY Thomas C. Betts
his ATTORNEY.

Patented Mar. 14, 1939

2,150,765

UNITED STATES PATENT OFFICE 2,150,765

COUPLING

Axel Albert Forsberg, Stockholm, Sweden, assignor to Electrolux Corporation, Dover, Del., a corporation of Delaware Application February 1, 1937, Serial No. 123,347
In the Netherlands February 10, 1936

4 Claims. (Cl. 285—174)

My invention relates to a coupling device for releasably and rotatably securing two hollow elements together. My invention is particularly well adapted for securing a hose to a vacuum cleaner unit and will be described as applied to a vacuum cleaner, although its application is not limited thereto.

In accordance with my invention the hose may be connected to the vacuum cleaner unit by merely inserting it in an opening formed therein. When connected the hose may be rotated relative to the unit and the connection is capable of transmitting the force necessary to move the unit by means of the hose. At the same time, the connection is releasable by merely grasping and pulling a sleeve in a direction which is the natural one to remove the hose from the unit. Consequently, the same motion results in first releasing the coupling and then withdrawing the hose from the opening formed in the vacuum cleaner unit.

In spite of the advantages briefly outlined above, the construction of my improved coupling is extremely simple and its cost of manufacture is low.

Further objects and advantages will be apparent from the following description considered in connection with the accompanying drawing, which forms a part of this specification and of which:—

Figure 1:
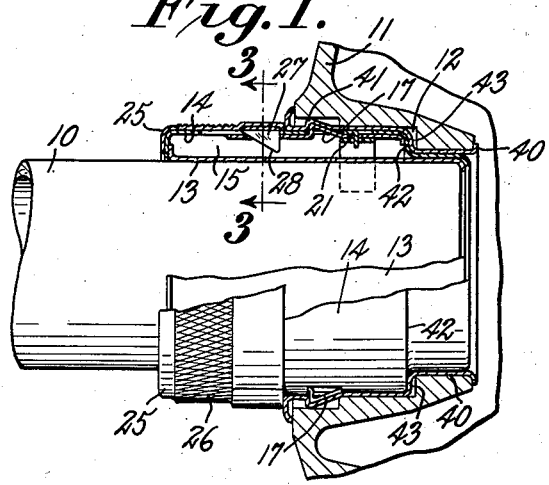
Fig. 1 is a cross-sectional view of a preferred embodiment of my invention.

Referring to the drawing, reference character 10 designates one of the hollow elements while reference character 11 designates the other. As shown, element 10 consists of a hose while element 11 is a portion of the vacuum cleaner unit and is provided with a central bore or opening 12, which may be either the suction or exhaust opening.

Secured to the end of hose 10 is a sleeve 13. The sleeve may be pressed around the hose or it may be glued thereto, or both.

Secured in any suitable manner to sleeve 13 is an outer cylindrical member 14, forming with the sleeve an annular space 15 within which is disposed latching mechanism. This mechanism includes a latch member 16 which is formed with a projecting portion 17. One face of portion 17 is inclined, as is shown at 18, while the other face is abrupt as is shown at 19. Outer sleeve 14 is formed with an opening 20 through which portion 17 may be projected by means of a spring 21. Spring 21 has a curved shape with the ends of the spring bearing against sleeve 13, while the center portion of the spring bears against latch member 16, thus tending to move the latch member in a radial direction. The spring is formed with an aperture 22 in alignment with an aperture 23 formed in the latch member 16. A portion 24 of outer sleeve 14 is struck inwardly so as to project through openings 22 and 23 thus retaining the spring and the latch member in position. Instead of employing a separate spring 21, the latch member 16 may be made of resilient material and fixed at the end to outer sleeve 14.

Slidably mounted on the outside of cylindrical member 14 is an axially displaceable releasing member or sleeve 25, preferably formed with a hand grip portion 26. Suitably secured to sleeve 25 is an inwardly projecting member 27 having an inclined face 28. Member 27 extends through an opening 29 formed in outer cylindrical member 14, and also extends into an opening 30 formed in latch member 16.

Figure 3:
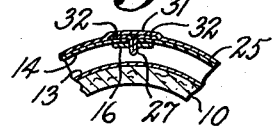
Fig. 3 is a cross-sectional view taken on the line 3—3 of Fig. 1.

Fig. 3 shows in detail a convenient manner of securing projection 27 to sleeve 25. As shown, the sleeve is formed with an enlarged portion 31 and projection 27 includes curved wings 32 which are received between cylindrical member 14 and the enlarged portion 31 of the sleeve. Thus, projection 27 is secured to the sleeve and caused to travel axially with the sleeve.

While I have described but one latch mechanism, it is preferable that at least two such mechanisms be provided in order that the axial pull on the hose will be distributed evenly. Inasmuch as each mechanism includes a projection 27 connected to sleeve 25, all of the latch members 16 will be retracted simultaneously. Individual springs 21 may be employed for each latch member, or a single circular spring may serve for all latch members.

The opening 12 of element 11 is preferably provided with a liner 40 having a cross-sectional configuration shown in Fig. 1. It will be noted that the liner includes an annular groove 41 having a cross-sectional shape corresponding to the projecting portion 17 of the latch member, and so positioned that, when the hose 10 is inserted in liner 40, projecting portion 17 will engage within groove 41. Cylindrical portion 14 is formed with a shoulder 42 adapted to contact a similar shoulder 43 on the liner 40 to limit inward movement of the hose.

Figure 2:
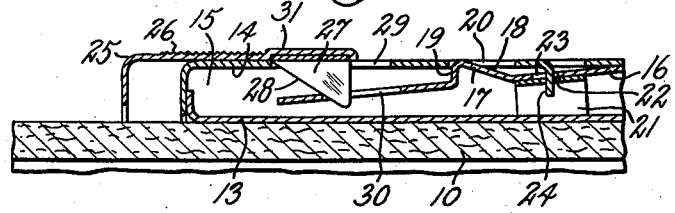
Fig. 2 is a cross-sectional view on an enlarged scale showing a portion of the device illustrated in Fig. 1.

If it is desired to uncouple hose 10 from the element 11, the hand grip portion 26 of the sleeve 25 is pulled in a direction away from element 11, which is the natural movement for removing the hose. The sleeve is thus caused to slide axially and projections 27 move in a similar manner. Inclined face 28 of the projection forces the free end of latch member 16 inwardly against the force of spring 21 to the position shown in Fig. 2. In this position, the projecting portion 17 of the latch member has been withdrawn so as to be flush with the outer surface of cylindrical member 14 and consequently has been withdrawn from engagement with the groove 41 in liner 40. The coupling is now released and a continued pull on sleeve 25 will cause the hose to be withdrawn from element 11.

As soon as the pull on sleeve 25 ceases, spring 21 returns latch member 16 to its original position and the latch member acting against the inclined face 28 of projection 27 returns sleeve 25 to its original position.

When connecting the coupling, it is merely necessary to insert the end of the hose within liner 40. The inclined face 18 of projecting portion 17 enables the latch member to be pressed inwardly by the outer end of liner 40, and thus pass within the liner until it becomes aligned with groove 41, when the spring 21 will project the latch member outwardly into engagement with the groove. When so engaged, the hose may be rotated within the liner due to the fact that groove 41 is continuous. Due to the fact that face 19 of the latch member is abrupt, a pull exerted on the hose itself has no tendency to release the coupling.

It will thus be seen that in accordance with my invention there is provided a very simple and easily manipulated releasable and rotatable coupling.

While I have hown one more or less specific embodiment of my invention, it is to be understood that this has been done for purposes of illustration only and that the scope of my invention is to be limited only by the appended claims viewed in the light of the prior art.

What I claim is:—

1. A detachable coupling for connecting two hollow telescoping fluid conveying elements together including a latch member movably carried on the exterior of the inner of said elements and being projectable into engagement with the outer element, a releasing member movably carried on the exterior of said inner element and provided with an inclined surface movable against said latch member to retract the latter from engagement with said other of said elements, and resilient means for projecting said latch member and for returning said releasing member.

2. A detachable coupling for connecting two hollow telescoping fluid conveying elements together including a sleeve forming an annular space around the outside of the inner element, a latch member movably mounted in said space and having a projecting portion resiliently projectable through an opening in said sleeve, and a releasing member axially movable on the outside of said sleeve and having a projection extending through an opening in said sleeve into said space, said projection having an inclined face adapted to contact said latch member when the releasing member is moved in one direction to retract the projecting portion of said latch member.

3. A detachable coupling for connecting two hollow telescoping fluid conveying elements together including a sleeve forming an annular space around the outside of the inner element, a latch member movably mounted in said space and having a projecting portion resiliently projectable through an opening in said sleeve, said latch member having an opening, and a member extending inwardly from said sleeve and through the last mentioned opening to retain said latch member in position.

4. A detachable coupling for connecting two hollow telescoping fluid conveying elements together including a sleeve forming an annular space around the outside of the inner element, a latch member movably mounted in said space and having a projecting portion projectable through on opening in said sleeve, a spring bearing against said latch member to project said portion, said latch member and said spring having aligned openings, and a member extending inwardly from said sleeve and through the last mentioned openings to retain said latch member and spring in position.

AXEL ALBERT FORSBERG.